United States Patent
Udell et al.

(10) Patent No.: US 7,913,124 B2
(45) Date of Patent: Mar. 22, 2011

(54) APPARATUS AND METHODS FOR CAPTURE OF FLOW CONTROL ERRORS IN CLOCK DOMAIN CROSSING DATA TRANSFERS

(75) Inventors: John C. Udell, Colorado Springs, CO (US); Richard Solomon, Colorado Springs, CO (US); Eugene Saghi, Colorado Springs, CO (US); Jeffrey K. Whitt, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 268 days.

(21) Appl. No.: 12/247,785

(22) Filed: Oct. 8, 2008

(65) Prior Publication Data

US 2010/0088554 A1 Apr. 8, 2010

(51) Int. Cl.
*G06F 11/00* (2006.01)
(52) U.S. Cl. .......................................................... 714/49
(58) Field of Classification Search .................. None
See application file for complete search history.

(56) References Cited

U.S. PATENT DOCUMENTS

| | | | |
|---|---|---|---|
| 7,245,613 B1 * | 7/2007 | Winkles et al. | 370/365 |
| 7,340,551 B2 * | 3/2008 | Elliott et al. | 710/309 |
| 7,698,477 B2 * | 4/2010 | Breti et al. | 710/29 |
| 2004/0100944 A1 * | 5/2004 | Richmond et al. | 370/360 |

* cited by examiner

*Primary Examiner* — Michael C Maskulinski
(74) *Attorney, Agent, or Firm* — Duft Bornsen & Fishman, LLP

(57) ABSTRACT

Apparatus methods for capturing flow control errors in FIFO exchanges between producing and consuming circuits operating in different clock domains. Tag information at the start of an exchange is transferred to a synchronizing component before data of a transfer transaction is entered in the FIFO. The tag information is also associated with each unit of data transferred to the FIFO by the producing circuit. The synchronizing component verifies the each unit of data retrieved by the consuming circuit has the expected tag information associated therewith and signals an error is the tag information does not match. Thus an error by the producing circuit in entering too much or too little data for a transfer is detected before erroneous data is retrieved and processed by the consuming circuit.

18 Claims, 3 Drawing Sheets

APPARATUS AND METHODS FOR CAPTURE OF FLOW CONTROL ERRORS IN CLOCK DOMAIN CROSSING DATA TRANSFERS

RELATED PATENTS

This patent application is related to U.S. patent application Ser. No. 07-1968 filed herewith and entitled APPARATUS AND METHODS FOR TRANSLATION OF DATA FORMATS BETWEEN MULTIPLE INTERFACE TYPES which is hereby incorporated by reference.

BACKGROUND

1. Field of the Invention

The invention relates generally to data transfers between circuits operating in different clock domains and more specifically relates to rapid capture of flow control errors in exchange of data through a FIFO between a source producing circuit and a consuming circuit operable in different clock domains.

2. Discussion of Related Art

Data transfers between a data producing circuit and a data consuming circuit often use a FIFO (first in first out memory buffer) to compensate for speed differences when the producer and consumer circuits operate in different clock domains—i.e., different clock frequencies. For example, a serial attached SCSI (SAS) core logic circuit may be coupled to a host system bus (e.g., a PCI bus) for exchange of information between a SAS device and the host system. The SAS core logic is often coupled to the host system bus control logic using a FIFO because the signaling speeds relating to SAS data exchanges and that of the host system bus exchanges are often different—i.e., they each operate in associated but different clock domains.

The FIFO serves to buffer data from the producing circuit at its normal operating speed in its clock domain such that the consuming circuit may retrieve and process the data at its normal operating speed in its separate and different clock domain. In such a circuit some flow control is typically required. Simple flow control logic such as signals indicating when the FIFO is empty, full, or above/below and intermediate threshold capacity serves to hold off the producer if the consumer is slower at consuming the data produced and stored in the FIFO. However, if the producing circuit erroneously places too little or too much information in the FIFO for a particular exchange then the simple flow control is inadequate to detect the error. Similarly, if the consuming circuit erroneously retrieves too much or too little data for a particular exchange, the simple flow control logic is inadequate to detect such an error. These errors may be referred to herein as "over-run" and "under-run" errors or conditions. Such an error may not be detected until much later after many more exchanges have been attempted between the producer and consumer. At such later time, higher layer control logic may detect unexpected sequences of information and flag an error condition. However, the underlying cause, i.e., the error by the consumer or the producer, is far removed from the later detection of an erroneous exchange. This problem raises significant challenges in design and test of a circuit including such a producer/consumer exchange.

Thus it is an ongoing challenge to improve the timing for detecting such an error in a FIFO exchange of information between a producing circuit and a consuming circuit each operable in different clock domains.

SUMMARY

The present invention solves the above and other problems, thereby advancing the state of the useful arts, by providing apparatus and methods for detecting an error in exchanges between a producing circuit and a consuming circuit through a FIFO as early as possible in the FIFO operations. Tag information associated with a particular transfer from the producer to the consumer is forwarded from the producer to the consumer before the information is entered into the FIFO. The tag information may include a specific command and an associated data length of information to be placed in the FIFO by the producer. Corresponding tag information is associated with each unit of data added to the FIFO by the producing circuit. The consuming circuit may then compare the tag information associated with each unit of data retrieved from the FIFO with expected tag information received from the producer at the start of each exchange to quickly detect an error in the information retrieved from the FIFO. By such early detection of an error, the source of the error may be more easily determined by a design or test engineer.

In one aspect hereof, an apparatus is provided, the apparatus includes a producer circuit operable in a first clock domain adapted to generate data transfer transactions. Each data transfer transaction comprises a sequence of one or more units of data and each data transfer transaction has associated tag information. The apparatus further includes a consumer circuit operable in a second clock domain adapted to receive the data transfer transactions. The apparatus also includes a data first in first out (FIFO) coupled to receive the data transfer transactions and the associated tag information from the producer circuit and coupled to apply the received data transfer transactions to the consumer circuit. The apparatus includes synchronizing logic coupled to the producer circuit and coupled to the consumer circuit and coupled to the data FIFO and adapted to detect an error in a data transfer transaction between the producer circuit and the consumer circuit based on the tag information associated with the data transfer transaction and further adapted to generate an error signal indicating detection of said error.

Another aspect hereof provides a method for transferring data between a producer circuit and a consumer circuit through a data first in first out (FIFO). The method includes adding tag information from the producer circuit to an expected tag information FIFO associated with the producer circuit and associated with the consumer circuit. The tag information is transferred by the producer circuit at the start of a new data transfer transaction from the producer circuit to the consumer circuit. The method then associates the tag information with each unit of data of the data transfer transaction stored in the data FIFO. The method further includes comparing the tag information in the expected tag information FIFO with the tag information associated with each unit of data as each unit of data is retrieved from the data FIFO by the consumer circuit. The method then generates an error signal responsive to a mismatch in the comparison.

DETAILED DESCRIPTION OF THE DRAWINGS

Figure 1:
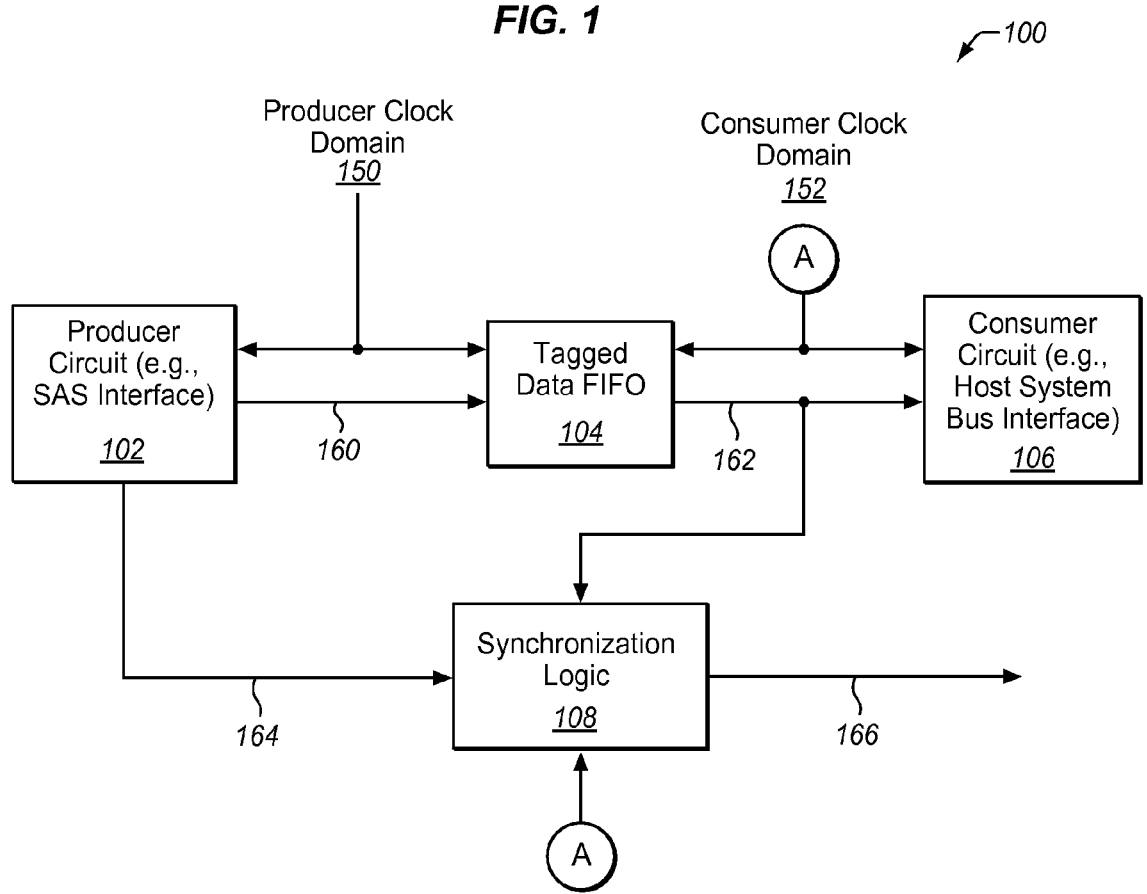
FIG. 1 is a block diagram of an exemplary apparatus for rapid capture of a flow control error in transfers between a producer and a consumer through a data FIFO in accordance with features and aspects hereof.

FIG. 1 is a block diagram of an apparatus 100 for data transfer transactions between a producer circuit 102 and a consumer circuit 106 through a data FIFO 104. Producer circuit 102 operates in a first clock domain, i.e., producer clock domain 150. Consumer circuit 106 operates in a separate clock domain, i.e., producer clock domain 152 (label A). For example, producer circuit 102 may be an I/O interface core logic circuit such as a serial attached SCSI (SAS) interface circuit. Such an I/O interface circuit will generally operate in a clock domain having a frequency related to the data transfer rate of the I/O device or network to which it is coupled. Consumer circuit 106 may be, for example, a host system bus interface adapted to exchange information with the I/O interface producer circuit 102. Such a host system bus interface circuit will generally operate at a speed relating to the host system performance and the particular bus structure selected for interacting with the host system processor. For example, consumer circuit 106 may represent a PCI bus interface circuit (e.g., a PCI Express or "PCI-E" bus interface) for coupling the producer circuit to a host system via a PCI bus or other similar interconnect bus structure.

Data FIFO 104 generally serves as a speed matching buffer (often referred to as an elasticity buffer) to permit producer circuit 102 and consumer circuit 106 to operate independently—each in its own separate clock domain. At the start of a new data transfer transaction, producer circuit 102 transfers tag information via path 164 to synchronization logic 108. The tag information may include, for example a transaction ID, a command or type of the transaction, and a length of the transaction measured in number of units of data. Following this initial transfer, producer circuit 102 applies each unit of data for the transaction to the data FIFO 104 via path 160. As used herein, "unit of data" means any suitable quantum of data useful for a particular application. A unit of data may be measured as a single byte or less. In many applications multiple numbers of bytes may be transferred to form 16, 32, or 64 bit words for exchanges between the producer circuit 102 and the consumer circuit 106. Therefore path 160 is a suitably wide data path for effectuating the transfer of each unit data from the producer circuit 102 to the data FIFO 104.

Consumer circuit 106 retrieves units of data stored in data FIFO 104 via path 162. In like manner, path 162 is any suitable bus structure appropriate to transfer units of data from data FIFO 104 to the consumer circuit 106.

In accordance with features and aspects hereof, each unit of data transferred from producer circuit 102 to data FIFO 104 is associated with corresponding tag information also stored in the data FIFO 104. As a matter of design choice, each entry in the FIFO may include the unit of data and the corresponding tag information. Alternatively, for example, data FIFO 104 may be divided such that at the a first portion of the FIFO stores a unit of data while a second portion stores corresponding, associated tag information for the unit of data stored in the first portion of the data FIFO 104. Still further, for example, data FIFO 104 may be implemented as multiple FIFO devices such that a first FIFO circuit is used for storing the units of data and a parallel second FIFO or multiple parallel FIFOs are used to store associated tag information for each unit of data.

As consumer circuit 106 retrieves a next unit of data from FIFO 104 via path 162, synchronization logic 108 snoops operation of the consumer circuit 106 to retrieve units of data and associated tag information via path 162 and compares the retrieved tag information associated with each retrieved unit of data with the expected tag information generated by the producer circuit 102 at the beginning of the transaction. If synchronization logic 108 detects an error in the comparison, an error signal is generated and applied to path 166 to signify an error in the exchange between producer circuit 102 and consumer circuit 106 via FIFO 104. For example, if producer circuit 102 generates a transaction intended to transfer a predetermined number of units of data but due to design or operational failures sends too many (over-run) or too few units of data (under-run), synchronization logic 108 will detect a mismatch between the expected tag information initially provided by producer circuit 102 at the start of the transaction and the retrieved tag information.

Figure 4:
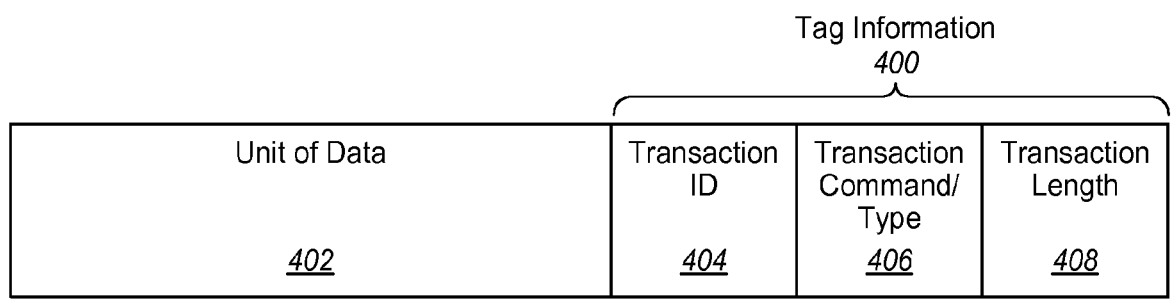
FIG. 4 is a diagram describing exemplary tag information used in the apparatus and methods in accordance with features and aspects hereof.

FIG. 4 provides an example of the tag information 400 that may be associated with each unit of data 402 and that may be provided as the expected tag information at the start of a newly generated transaction. Unit of data 402 may therefore be associated in the data FIFO with tag information 400. Tag information 400 may include, for example, a transaction ID 404, a transaction command or type 406, and a transaction length 408 measured in units of data to be transferred by the transaction. As a matter of design choice, less than all of the tag information 400 may be stored in the data FIFO associated with its corresponding unit of data 402. For example, only the transaction ID 404 may be stored with and associated with the unit of data 402 in the data FIFO. All of the tag information 400, including the other components of tag information 400 such as the transaction command or type 406 and the transaction length 408, may be applied to the synchronization logic of FIG. 1 above for use in the comparison and error detection within the synchronization logic.

Figure 2:
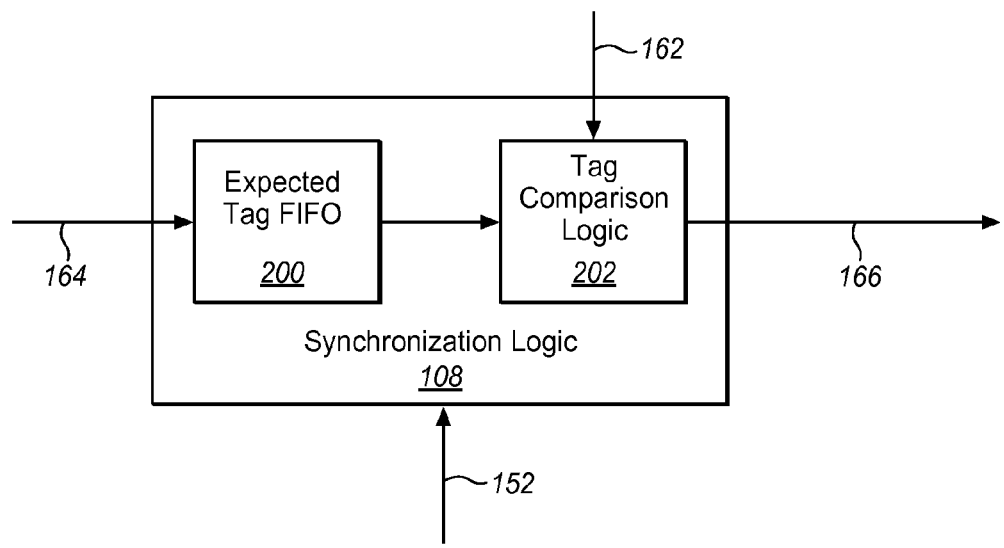
FIG. 2 is a block diagram providing exemplary additional details of the synchronization logic of FIG. 1.

FIG. 2 is a block diagram providing exemplary additional details of synchronization logic 108 of FIG. 1. At the beginning of each transaction, expected tag information for the transaction is applied from the producer circuit via path 164 and stored in an expected tag FIFO 200. Depending on the relative clock speeds of the two distinct clock domains, a producer could produce multiple transactions stored in the data FIFO (104 of FIG. 1) faster than a consumer circuit can retrieve the units of data for the transaction. Therefore, synchronization logic 108 may use FIFO 200 to permit storage of tag information values corresponding to multiple such transactions generated by the producer circuit. As transaction data is retrieved by a consumer circuit via path 162, tag comparison logic 202 of synchronization logic 108 compares the expected tag information in the current entry of the expected tag FIFO 200 with the tag information associated with each retrieved unit of data retrieved via path 162 from the data FIFO (104 of FIG. 1). If the comparison performed by logic 202 detects a mismatch in the retrieved tag information and the expected tag information, an error signal is generated and applied to path 166 for application to the consumer circuit (106 of FIG. 1) or to other appropriate error handling logic within the system utilizing the consumer circuit.

The producer is operating in a first clock domain and the consumer circuit operates in a second clock domain. The synchronization function of logic 108 is operable based on attempts by the consumer circuit to retrieve a next unit of data from the FIFO 104 and thus synchronization logic 108 may operate based on the second clock domain—that of the consumer circuit as applied to path 152

Those of ordinary skill in the art will readily recognize numerous additional and equivalent elements in a fully functional apparatus 100 of FIG. 1 and synchronization logic 108 of FIG. 2. Such additional and equivalent elements are well known to those of ordinary skill in the art and are omitted for here simplicity and brevity of this discussion.

Figure 3:
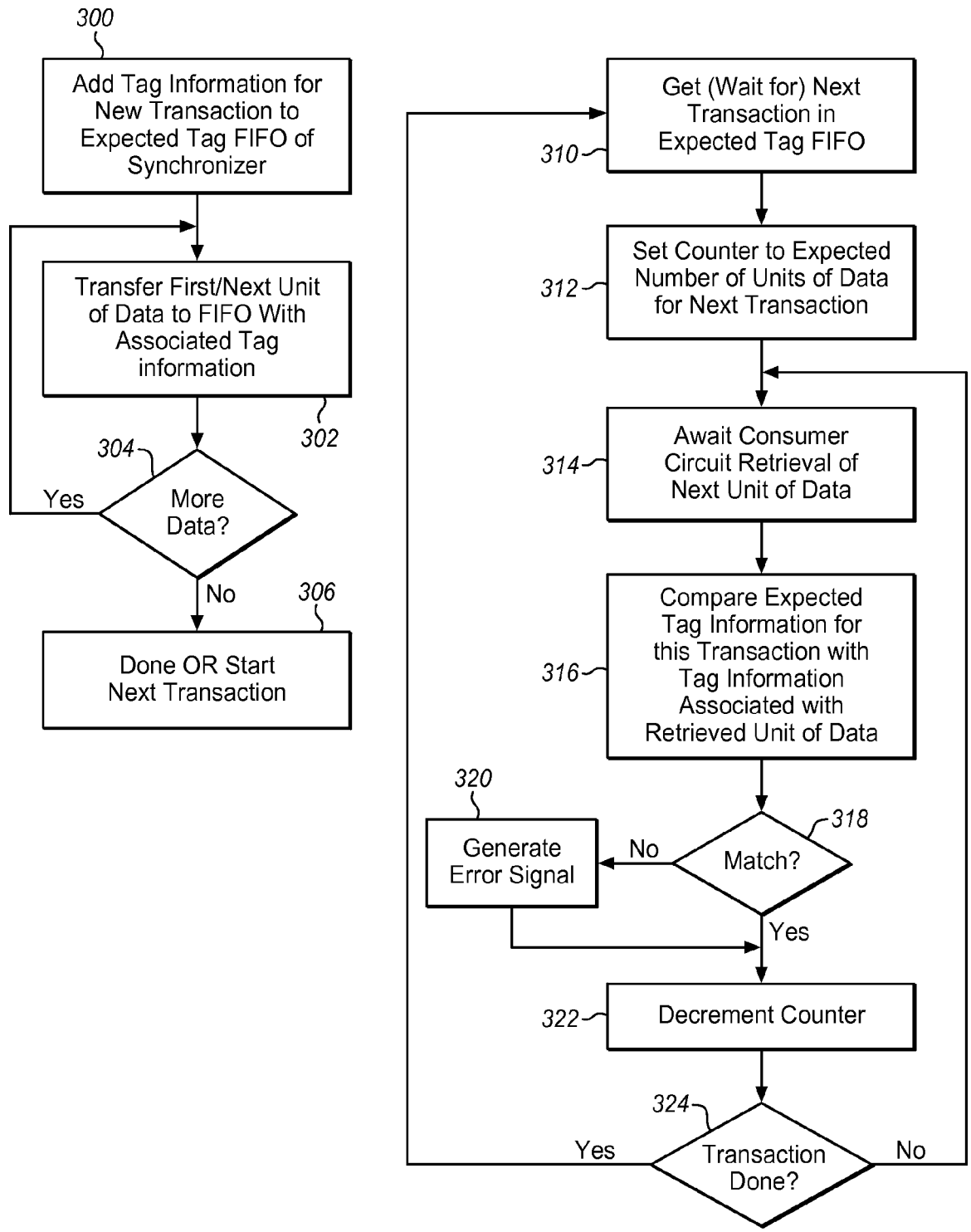
FIG. 3 is a flowchart describing an exemplary method in accordance with features and aspects hereof to capture an error in flow control between a producer and a consumer through a data FIFO.

FIG. 3 is a flowchart describing exemplary methods in accordance with features and aspects hereof to rapidly capture an error in transfers between a producing circuit and the consuming circuit each operating in its respective, different clock domain. Steps 300 through 306 represent processing of the consumer circuit to initiate a data transfer transaction through the data FIFO for eventual retrieval by the consuming circuit. Step 300 first adds a tag information entry into the expected tag information FIFO (e.g., within the synchronizing logic of the apparatus). The tag information as noted above may include a transaction identifier to uniquely identify each transaction as well as the transaction command or type and a length of the transaction measured in units of data to be applied to the data FIFO. Steps 302 through 304 are then iteratively operable to transfer units of data from the producer circuit to the data FIFO along with tag information associated with each unit of data. As noted above, tag information to be stored in the data FIFO associated with each unit of data may be reduced to the transaction ID to reduce the required capacity of the FIFO storing the data and its associated tag information. Specifically, step 302 transfers the first or next unit of data to the data FIFO along with the associated tag information for that unit of data. Step 304 then determines whether more units of data need to be transferred for this transaction. If so, processing loops back to step 302 until all units of data and associated tag information have been successfully transferred. When the data transfer transaction has been completely stored in the data FIFO along with the associated tag information, step 306 completes processing or, if necessary, immediately commences a next transaction to be transferred to the consuming circuit. From the perspective of the producing and consuming circuits, there need be no latency or delay between transactions. Rather, the next transaction may immediately follow (e.g., back to back) a preceding data transfer transaction.

Steps 310 through 324 represent operation of synchronizing logic synchronization logic to rapidly detect an error in the data transfer generated by the producer circuit. As noted above, due to design or operational errors, a data transfer transaction by the producing circuit may erroneously enter too few or too many units of data into the data FIFO for a particular transaction. Step 310, operable within the synchronization logic, retrieves a next entry from the expected tag FIFO corresponding to a next transaction generated by the producing circuit. If no next entry has yet been stored in the expected tag FIFO, step 310 waits for a next transaction to be generated by the producing circuit and a corresponding entry of tag information entered into the expected tag FIFO by the producing circuit.

As noted above, the transaction information entered into the expected tag FIFO may include an expected length of the transaction measured in units of data. Step 312 then sets a counter associated with the synchronization logic to the expected number of units of data for this next transaction to be retrieved by the consuming circuit. Step 314 then awaits the consumer circuit retrieval of the next unit of data from the data FIFO. As noted above, the synchronization logic snoops the communication path between the consumer circuit and the data FIFO to detect an attempt to retrieve the next unit of data by the consumer circuit. Upon detecting such a retrieval of the next unit data by the consumer circuit, step 316 compares the tag information associated with the unit of data retrieved by the consumer circuit with the expected tag information for this transaction. For example, if the transaction ID associated with, and retrieved with the unit of data from the data FIFO does not match the transaction ID in the expected tag information entry for this transaction, an error condition is thereby detected. Step 318 then determines whether the comparison detected a match or mismatch. If the tag information does not match, step 320 generates an error signal indicating capture of an error condition in the transaction as stored in and/or as retrieved from the data FIFO.

The error signal so generated may be applied to the consumer circuit or to any other suitable error handling logic. By capturing the error condition as soon as possible, a circuit designer or other logic within the device incorporating the consumer circuit may rapidly identified which transaction generated the error condition rather than, as presently practiced, detecting an error significantly later when other units of data retrieved from the data FIFO cause a higher level logical error.

Step 322 then decrement the counter for units of data for this transaction. Step 324 next determines whether all the units of data for this transaction have been retrieved as indicated by the counter decrementing to zero. If not, processing continues looping back to step 314 to continue monitoring the retrieval of units of data from the data FIFO by the consumer circuit. Those of ordinary skill in the art will readily recognize that upon generation of an error signal by step 320, other logic (not shown) of the consumer circuit may simply halt further processing including that of the synchronization logic so that the captured error may be properly analyzed or otherwise processed and the application circuits appropriately reset or redesigned to overcome the error. If step 324 determines that all units of data for the present transaction have been processed, the method loops back to step 310 to get, or wait for, the next transaction as indicated by an entry in the expected tag FIFO.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. Apparatus comprising:

a producer circuit operable in a first clock domain adapted to generate data transfer transactions wherein each data transfer transaction comprises a sequence of one or more units of data and wherein each data transfer transaction has associated tag information, wherein the producer circuit is further operable to generate expected tag information for each data transfer transaction before starting each data transfer transaction;

a consumer circuit operable in a second clock domain adapted to receive the data transfer transactions;

a data first in first out (FIFO) coupled to receive the data transfer transactions and the associated tag information from the producer circuit and coupled to apply the received data transfer transactions to the consumer circuit; and synchronizing logic coupled to the producer circuit and coupled to the consumer circuit and coupled to the data FIFO, wherein the synchronizing logic is adapted to receive the expected tag information from the producer circuit, wherein the synchronizing logic is further adapted to detect an error in a data transfer transaction between the producer circuit and the consumer circuit based on the associated tag information and the expected tag information, and wherein the synchronizing logic is further adapted to generate an error signal indicating detection of said error.

2. The apparatus of claim 1
wherein the synchronizing logic comprises:
an expected tag FIFO adapted to store the expected tag information for each data transfer transaction; and
tag comparison logic adapted to compare the expected tag information with the associated tag information of a data transfer transaction wherein the tag comparison logic is adapted to generate said error signal when the expected tag information in the expected tag FIFO for a portion of a data transfer transaction does not match the associated tag information retrieved from the data FIFO by the consumer circuit.

3. The apparatus of claim 1
wherein the associated tag information comprises a length of the data transfer transaction,
wherein the synchronization logic is operable to determine that an amount of data retrieved from the data FIFO by the consumer circuit does not match the length in the tag information associated with the data transfer transaction and wherein the synchronization logic is further operable to generate the error signal in response to the determination that the amount of retrieved data does not match the length.

4. The apparatus of claim 1
wherein the producer circuit is a Serial Attached SCSI (SAS) interface circuit, and
wherein the consumer circuit is a PCI bus interface circuit.

5. The apparatus of claim 1
wherein the synchronization logic is operable to detect an over-run error in the data transfer transaction.

6. The apparatus of claim 1
wherein the synchronization logic is operable to detect an under-run error in the data transfer transaction.

7. The apparatus of claim 1
wherein the apparatus is operable to perform consecutive data transfer transactions between the producer circuit and the consumer circuit with zero latency between the consecutive data transfer transactions.

8. A method for transferring data between a producer circuit and a consumer circuit through a data first in first out (FIFO), the method comprising:
adding tag information from the producer circuit to an expected tag information FIFO associated with the producer circuit and associated with the consumer circuit wherein the tag information is transferred by the producer circuit at the start of a new data transfer transaction from the producer circuit to the consumer circuit;
associating the tag information with each unit of data of the data transfer transaction stored in the data FIFO;
comparing the tag information in the expected tag information FIFO with the tag information associated with each unit of data as each unit of data is retrieved from the data FIFO by the consumer circuit; and
generating an error signal responsive to a mismatch in the comparison.

9. The method of claim 8 further comprising:
generating another data transfer transaction by the producer circuit upon completion of the data transfer transaction with zero latency between the data transfer transaction and said another data transfer transaction.

10. The method of claim 8
wherein the tag information comprises a length of the data transfer transaction,
wherein the step of comparing further comprises:
comparing the length in the expected tag information FIFO with an amount of data retrieved from the data FIFO by the consumer circuit, and
wherein the step of generating further comprises:
generating the error signal in response to the amount of retrieved data being different than the length.

11. The method of claim 8
wherein the step of generating an error signal further comprises generating an error signal indicative of detecting an over-run error in the data transfer transaction.

12. The method of claim 8
wherein the step of generating an error signal further comprises generating an error signal indicative of detecting an under-run error in the data transfer transaction.

13. A system comprising:
a Serial Attached SCSI (SAS) interface circuit adapted for coupling a SAS device to a host system bus and adapted to produce data transfer transactions to be transferred to the host bus, wherein the SAS interface circuit is further operable to generate expected tag information for each data transfer transaction before starting each data transfer transaction;
a host system having a host system bus adapted for coupling to the SAS interface circuit and adapted to receive data transfer transactions from the SAS interface circuit;
a data first in first out (FIFO) coupled between the SAS interface circuit and the host system bus adapted to receive the data transfer transactions and adapted to receive tag information associated with each unit of data in each data transfer transaction; and
synchronization logic coupled to the SAS interface circuit and coupled to the host system bus and coupled to the data FIFO, wherein the synchronizing logic is adapted to receive the expected tag information from the SAS interface circuit, wherein the synchronizing logic is further adapted to detect an error in a data transfer transaction between the SAS interface circuit and the host system bus based on the associated tag information and the expected tag information, and wherein the synchronizing logic is further adapted to generate an error signal indicating detection of said error.

14. The system of claim 13
wherein the synchronizing logic comprises:
an expected tag FIFO adapted to store the expected tag information for each data transfer transaction; and
tag comparison logic adapted to compare the expected tag information with the associated tag information of a data transfer transaction wherein the tag comparison logic is adapted to generate said error signal when the expected tag information in the expected tag FIFO for a unit of data of a data transfer transaction does not match the associated tag information retrieved from the data FIFO by the host system bus.

15. The system of claim 13
wherein the associated tag information comprises a length of the data transfer transaction,
wherein the synchronization logic is operable to determine that an amount of data retrieved from the data FIFO by the host system bus does not match the length in the tag information associated with the data transfer transaction and wherein the synchronization logic is further operable to generate the error signal in response to the determination that the amount of retrieved data does not match the length.

16. The system of claim 13 wherein the host system bus is a PCI bus interface circuit.

17. The system of claim 13 wherein the synchronization logic is operable to detect an error in the data transfer transaction before the host system bus retrieves any unit of data from a next data transfer transaction stored in the data FIFO.

18. The system of claim 13 wherein the system is operable to perform consecutive data transfer transactions between the SAS interface circuit and the host system bus with zero latency between the consecutive data transfer transactions.

* * * * *